H. E. WIMPERIS.
DIRECTOR APPARATUS FOR USE ON AIRCRAFT.
APPLICATION FILED FEB. 10, 1919.
1,313,934.
Patented Aug. 26, 1919.
2 SHEETS—SHEET 1.
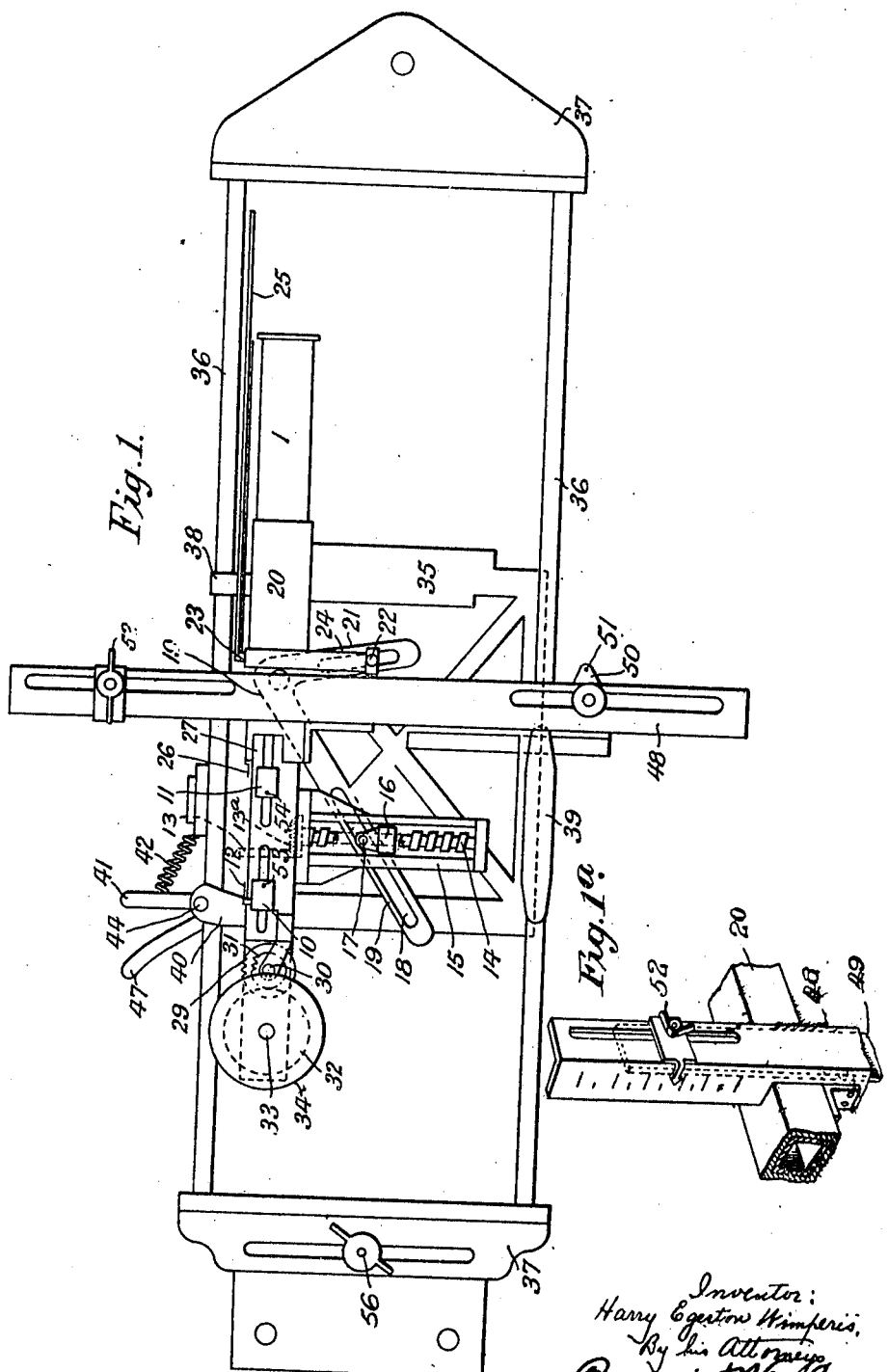

H. E. WIMPERIS.
DIRECTOR APPARATUS FOR USE ON AIRCRAFT.
APPLICATION FILED FEB. 10, 1919.
1,313,934.
Patented Aug. 26, 1919.
2 SHEETS—SHEET 2.
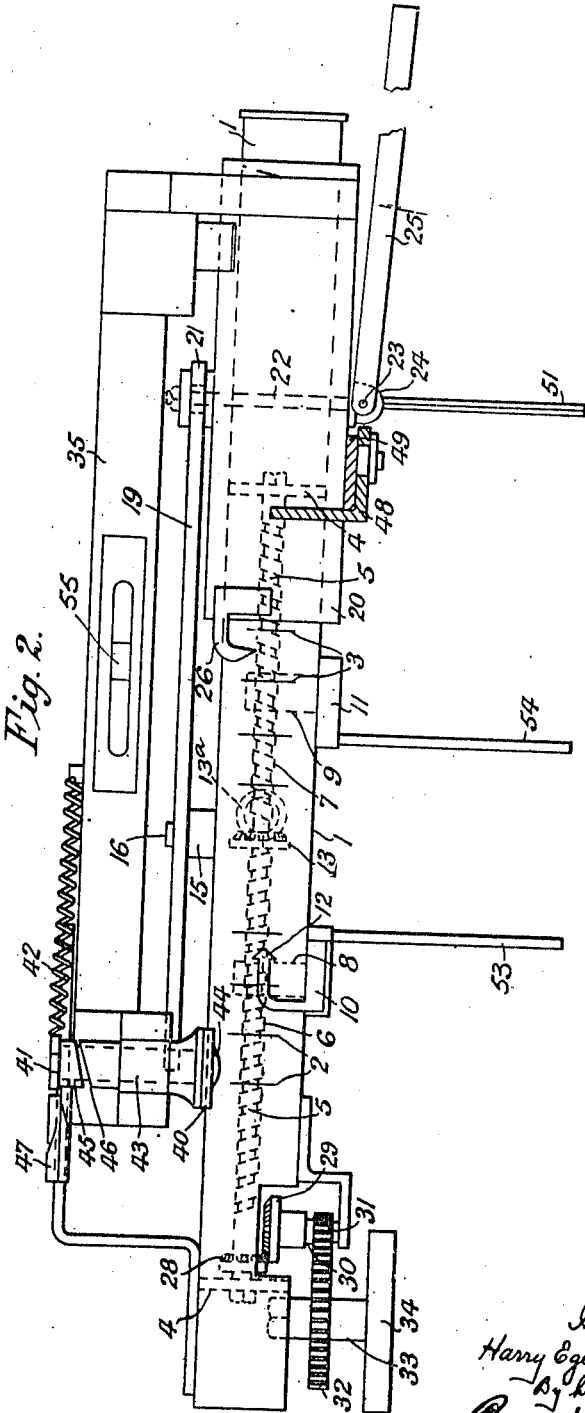

UNITED STATES PATENT OFFICE.

HARRY EGERTON WIMPERIS, OF GORING, ENGLAND.

DIRECTOR APPARATUS FOR USE ON AIRCRAFT.

1,313,934.          Specification of Letters Patent.          Patented Aug. 26, 1919.

Application filed February 10, 1919. Serial No. 276,065.

*To all whom it may concern:*

Be it known that I, HARRY EGERTON WIMPERIS, a subject of the King of Great Britain, residing at The Cottage, Goring-on-Thames, England, have invented a new and useful Improvement in Director Apparatus for Use on Aircraft, of which the following is a specification.

This invention has for its object the provision for use on aircraft of apparatus applicable for navigational purposes, for determining the velocity of the wind and the ground speed of the aircraft.

One form of apparatus constructed according to this invention is illustrated in the accompanying drawings, in which Figure 1 is a side elevation of the apparatus arranged for mounting in position on the aircraft, Fig. 1ª is a detail view in perspective showing the rod graduated for altitude and provided with an adjustable pointer, and Fig. 2 is a plan on a larger scale with the supports on which the apparatus is mounted removed.

1 is a longitudinal bar having on its upper face two sets of graduations, one set 2 for wind velocities, and the other set 3 for air speeds. Mounted on plates 4 within the bar 1 is a shaft 5 having right and left threads 6, 7, respectively, meshing with non-rotatable nuts 8, 9, to which are secured plates 10, 11, engaging one of the external vertical faces of the bar 1, the connecting pieces between the parts 8, 10, and 9, 11, passing through slots cut in the vertical face of the bar. The block 10 is provided with a pointer 12 moving over the wind velocity graduations.

The shaft 5 has fast on it a bevel wheel 13 mounted centrally with respect to the nuts 8, 9, and meshing with another bevel wheel 13ª, secured to a worm shaft 14 mounted in a bracket 15 secured to the bar 1. Meshing with shaft 14 is a nut 16 slidably and non-rotatably mounted in the bracket 15 and provided with a projecting pin 17 which engages in a slot 18 in one arm 19 of a bell crank lever pivotally mounted on an air speed sleeve 20 which fits around the bar 1 so that the latter can slide within it. The other arm 21 of the bell crank lever is slotted to engage a pin 22 secured to a vertical shaft 23 rotatably mounted in a bearing 24 secured to the sleeve 20. On the upper end of the shaft 23 a director bar or wire 25 is secured. The sleeve 20 carries a pointer 26 moving over the air speed graduations 3 and recessed at 27 to house the sliding plate 11 when the latter is near the limit of its outward adjustment.

The shaft 5 is rotated by a bevel wheel 28 fast on it and meshing with a bevel wheel 29 on a shaft 30 carrying a pinion 31 gearing with a wheel 32 on a shaft 33 to the outer end of which is secured a hand wheel 34.

It will be observed that rotation of the hand wheel 34 and shaft 5 moves both of the nuts 8 and 9, causing them to travel toward or away from each other, and causing the pointer 12 to move over the wind velocity graduations, and also effect the operation of the director bar 25 through the medium of the slotted bell crank 19, 21.

To adapt the apparatus as above described for use as a bomb sight the sleeve 20 is secured to a frame 35 which is mounted on two parallel bars 36 fixed in brackets 37 adapted to be adjustably clamped to any suitable part of the aircraft. The frame 35 is provided with spring clips, such as 38, 39, 40, respectively, the clip 40 being brought into or out of operation by operating a pivoted finger plate 41 normally controlled by a spring 42 and mounted on a bolt 43, the head of which 44 engages the clip 40. A cam shaped collar 45 is mounted on the finger plate 41 and engages a cam surface 46 fixed to the frame. To insure easy manipulation and to provide a stop a plate 47 is fixed to the frame 35 adjacent to the finger plate 41. On operating the finger plate against the spring 42, the bolt 43 moves away from the supporting bar 36 and allows the clip 40 to open to relieve the pressure on the bar, whereupon the frame 35 and all the parts supported thereby can be moved bodily along the bars 36.

The sleeve 20 is provided with a vertical bar 48 which is graduated for altitude, and on which slides a bar 49 provided with a pointer moving over the altitude graduations and with a carrier 50 for a sighting wire 51. The bar 49 is guided by pins passing through slots in the vertical bar 48 and is clamped in position by a nut 52.

The sliding blocks 10, 11, also carry sighting wires 53, 54.

55 is a bubble by means of which the instrument may be leveled and it can then be clamped by a nut 56.

In using the apparatus, the bar 1 is adjusted in the sleeve 20 until the pointer 26 is on the graduation 3 corresponding to the actual air speed, and the aircraft is made to fly more or less directly across the wind, so that the drift is a maximum. The hand wheel 34 is then rotated to operate the sliding blocks 10, 11, and the director bar 25, until the bar is at such a position that it coincides with the direction of the apparent land flow beneath the aircraft. The reading on the wind velocity graduation opposite the pointer 12 will then give the wind velocity.

The algebraic sum of the air speed and the wind velocity will give the ground speed of the aircraft when flying either head or tail to wind.

If now the sighting wire 51 on the altitude bar has been adjusted for altitude, the aircraft can fly up and down wind dropping bombs in both directions by using the sighting wires 54, 53, as back sights alternately in the correct order in conjunction with the sighting wire 51 as a fore sight.

What I claim is:—

1. In apparatus for use on aircraft, the combination of a frame, a member longitudinally adjustable thereon according to air speed, a vertical pivot carried by the frame, a land flow bar movable about the pivot, a fore sight, a back sight capable of longitudinal movement on the air speed member, and means whereby the setting of the bar parallel to the land flow moves the back sight.

2. In apparatus for use on aircraft, the combination of a frame, a member longitudinally adjustable thereon according to air speed, a vertical pivot carried by the frame, a land flow bar movable about the pivot, a fore sight capable of vertical adjustment, a back sight capable of longitudinal movement on the air speed member, and means whereby the setting of the bar parallel to the land flow moves the back sight.

3. In apparatus for use on aircraft, the combination of a frame, a member longitudinally adjustable thereon for air speed, a fore sight carried by said member, a land flow bar pivoted to said frame, a bar carried by the air speed member and graduated for wind velocity, a pointer capable of movement relatively to the wind velocity bar, a back sight, and means whereby the movement of the land flow bar sets the pointer relatively to the scale and sets the back sight.

4. In apparatus for use on aircraft, a sleeve, a bar capable of sliding movement therein and graduated for air speed and for wind velocity, a pointer capable of movement along the bar, a land flow bar pivoted to the sleeve, a fore sight carried by the sleeve, a back sight carried by the pointer, and means whereby the movement of the land flow bar sets the pointer.

5. In apparatus for use on aircraft, the combination of a sleeve, a tube capable of sliding movement therein and graduated for air speed and for wind velocity, a screw within the tube, means for rotating the screw, a non-rotatable nut upon the screw, a pointer carried by the nut, a back sight carried by the nut, a fore sight carried by the sleeve, a land flow bar pivoted to the sleeve and means whereby the rotation of the screw turns the land flow bar on its pivot.

6. In apparatus for use on aircraft, the combination of a sleeve, a tube capable of sliding movement therein and graduated for air speed and for wind velocity, a screw within the tube, means for rotating the screw, a non-rotatable nut upon the screw, a pointer carried by the nut, a back sight also carried by the nut, an altitude bar carried by the sleeve, a fore sight carried by the altitude bar and capable of adjustment thereon, a land flow bar pivoted to the sleeve and means whereby the rotation of the screw turns the land flow bar on its pivot.

7. In apparatus for use on aircraft, the combination of a sleeve, a tube capable of sliding movement therein and graduated for air speed and for wind velocity, a right and left hand screw within the tube, means for rotating the screw, two non-rotatable nuts upon the screw, a pair of back sights, one carried by each of the nuts, a pointer carried by one of the nuts, a fore sight carried by the sleeve, a land flow bar pivoted to the sleeve and means whereby the rotation of the screw turns the land flow bar on its pivot.

8. In apparatus for use on aircraft, the combination of a sleeve, a tube capable of sliding movement therein and graduated for air speed and for wind velocity, a right and left hand screw within the tube, means for rotating the screw, two non-rotatable nuts upon the screw, a pair of back sights, one carried by each of the nuts, a pointer carried by one of the nuts, an altitude bar carried by the sleeve, a fore sight carried by the altitude bar and capable of adjustment thereon, a land flow bar pivoted to the sleeve and means whereby the rotation of the screw turns the land flow bar on its pivot.

In testimony that I claim the foregoing as my invention I have signed my name this 23d day of January, 1919.

HARRY EGERTON WIMPERIS.